(12) United States Patent
Ma et al.

(10) Patent No.: US 10,412,176 B2
(45) Date of Patent: Sep. 10, 2019

(54) WEBSITE ACCESS METHOD, APPARATUS, AND WEBSITE SYSTEM

(71) Applicant: HUAWEI TECHNOLOGIES CO., LTD., Shenzhen, Guangdong (CN)

(72) Inventors: Huibin Ma, Xi'an (CN); Deping Tang, Shenzhen (CN); Wanqing Hu, Xi'an (CN); Xiangyang Wu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/785,653

(22) Filed: Oct. 17, 2017

(65) Prior Publication Data

US 2018/0041590 A1 Feb. 8, 2018

Related U.S. Application Data

(63) Continuation of application No. PCT/CN2015/099215, filed on Dec. 28, 2015.

(51) Int. Cl.
*H04L 29/08* (2006.01)
*G06F 17/22* (2006.01)
(Continued)

(52) U.S. Cl.
CPC .......... *H04L 67/146* (2013.01); *G06F 16/955* (2019.01); *G06F 16/958* (2019.01);
(Continued)

(58) Field of Classification Search
CPC ....... H04L 67/146; H04L 67/02; H04L 67/32; H04L 67/42; H04L 67/2842; G06F 17/2288; G06F 17/2247
See application file for complete search history.

(56) References Cited

U.S. PATENT DOCUMENTS

| | | | | |
|---|---|---|---|---|
| 5,860,071 A | * | 1/1999 | Ball | G06F 17/30899 707/695 |
| 7,886,032 B1 | * | 2/2011 | Louz-On | G06F 17/30887 709/217 |

(Continued)

FOREIGN PATENT DOCUMENTS

| | | |
|---|---|---|
| CN | 101147145 A | 3/2008 |
| CN | 102109989 A | 6/2011 |

(Continued)

OTHER PUBLICATIONS

Yunlong Zhang, "Front-end engineering (1): static resource version update and cache", InFoQ, Sep. 12, 2013, with an English translation, total 15 pages.

(Continued)

*Primary Examiner* — Joe Chacko
(74) *Attorney, Agent, or Firm* — Huawei Technologies Co., Ltd.

(57) ABSTRACT

In the website system of the application, when a client accesses a page of a website, a web server obtains an initial URL of a content file included in the to-be-accessed page and a version parameter of a current version of the website, generates a current URL of the content file, and adds the version parameter to a search part of the current URL of the content file, so that the client can obtain the content file from the web server according to the current URL. During version upgrade of the website, a developer does not need to change a path to a content file, does not need to manually change a URL of the content file, and does not need to update a name of the content file either. This improves website upgrading efficiency.

20 Claims, 8 Drawing Sheets

(51) Int. Cl.
  *H04L 29/06* (2006.01)
  *G06F 16/958* (2019.01)
  *G06F 16/955* (2019.01)

(52) U.S. Cl.
  CPC .......... *G06F 17/2288* (2013.01); *H04L 67/02* (2013.01); *H04L 67/32* (2013.01); *H04L 67/42* (2013.01); *G06F 17/2247* (2013.01); *H04L 67/2842* (2013.01)

(56) References Cited

U.S. PATENT DOCUMENTS

| | | | | |
|---|---|---|---|---|
| 8,655,943 | B2* | 2/2014 | Gill | G06F 17/30873 709/203 |
| 9,152,631 | B2* | 10/2015 | Kamekawa | G06F 17/30011 |
| 2005/0071766 | A1 | 3/2005 | Brill et al. | |
| 2005/0108626 | A1 | 5/2005 | Ong | |
| 2005/0262089 | A1* | 11/2005 | Wu | G06F 17/3089 |
| 2006/0218305 | A1 | 9/2006 | Kinnan et al. | |
| 2011/0029641 | A1* | 2/2011 | Fainberg | G06F 17/30902 709/219 |
| 2014/0173417 | A1* | 6/2014 | He | G06F 17/2247 715/234 |
| 2014/0235351 | A1 | 8/2014 | Takushima | |
| 2016/0188743 | A1* | 6/2016 | Vaish | G06F 17/30887 707/755 |
| 2017/0192970 | A1* | 7/2017 | Aasheim | G06F 17/3023 |

FOREIGN PATENT DOCUMENTS

| | | |
|---|---|---|
| CN | 102882974 A | 1/2013 |
| EP | 2475144 A1 | 7/2012 |
| JP | 2005251190 A | 9/2005 |
| JP | 2014160354 A | 9/2014 |
| RU | 2383920 C2 | 3/2010 |
| WO | 2006/104657 A1 | 10/2006 |

OTHER PUBLICATIONS

Jathon, "Quiet static resource cache and update", Blog, Apr. 22, 2015, with an English translation, total 9 pages.

"Front-end development of static files automatically add version number solution", http://html5cn.com,cn, Feb. 21, 2014, with an English translation, total 5 pages.

"From the input URL to the full page of the display page analysis", C blog, Apr. 11, 2013, with an English translation, total 8 pages.

* cited by examiner

WEBSITE ACCESS METHOD, APPARATUS, AND WEBSITE SYSTEM

CROSS-REFERENCE TO RELATED APPLICATIONS

This application is a continuation of International Application No. PCT/CN2015/099215, filed on Dec. 28, 2015, the disclosure of which is hereby incorporated by reference in its entirety.

TECHNICAL FIELD

The present invention relates to the field of information technologies, and in particular, to a website access method, an apparatus, and a website system.

BACKGROUND

The World Wide Web (WWW) originated in 1989, and uses a browser-server structure. By using the World Wide Web, a user can access, by using a web browser, rich information resources provided on a web server. Generally, files on the web server are stored in a file system on the web server. The web server maps, by using an organization structure in which a uniform resource locator (URL) corresponds to a filename, a URL received from the web browser into a file in a local file system. For example, server software is configured on a web server for a website "example.funnycorp.com", and a root directory of the web server software is set to "/home/public/web/". After a user enters a URL http://example.funnycorp.com/lips/raspberry.html on a web browser, the web browser sends a HyperText Transfer Protocol (HTTP) request to the web server, and the web server at "example.funnycorp.com" receives the HTTP request, and reads a file "/home/public/web/lips/raspberry.html". The file is carried in an HTTP response to return to the web browser. An HTTP response generally includes a Hypertext Markup Language (HTML) file, and may also include a text file, an image, or a file of another type. After downloading the received HTML file, the web browser caches the file in a local temporary folder. When the browser needs to access this website again, the browser directly reads the file from the cache instead of downloading it again from the web server, thereby speeding up website access. However, a file on the web server may be updated with an update of the website, and therefore, a mechanism is required to ensure that a latest file can be obtained by a browser during website access.

A file update mechanism based on file content hash is provided in the prior art to ensure dynamic updating of a web page. Specifically, a URL corresponding to a file stored on a web server is an absolute path. For example, a format of an absolute path for a file logo.gif is "/directory/subdirectory/ . . . /logo.gif". When the website is upgraded, if the file logo.gif is updated, a filename is changed to logo_hashcode.gif, where hashcode is a hash value calculated based on content of the file logo.gif. Each time when file content changes, hashcode is recalculated. Accordingly, the absolute path is changed to "/directory/subdirectory/ . . . /logo_hashcode.gif", and a user's browser of can obtain a latest file logo.gif according to this absolute path. In this manner, the dynamic updating of a web page is implemented.

However, files on the web server are mutually referenced. When another file has referenced logo.gif, a change of the filename of logo.gif causes a change of file content of the file that has referenced logo.gif, and consequently hashcode of the file that has referenced logo.gif needs to be recalculated according to changed file content. For example, a file a.js references logo.gif. When logo.gif changes, its filename changes to logo_hashcode.gif. In this case, file content of the file a.js changes accordingly, and its filename changes to a_hashcode.js. Therefore, in the prior art, when one file on a web server is updated, all files depending on the file are updated accordingly, which results in updating of massive files and increases risks in website upgrading.

SUMMARY

A website access method, an apparatus, and a website system are described herein, to lower website upgrading risks and improve website upgrading efficiency.

An embodiment of this application provides a website access method, including: receiving an access request from a client, where the access request indicates a to-be-accessed page on a website; obtaining an initial uniform resource locator URL of a content file included in the to-be-accessed page, where the initial URL includes original path information of the content file; obtaining a version parameter of a current version of the website, where each version of the website is corresponding to one upgrade of the website, and each version of the website is corresponding to a unique version parameter; generating a current URL of the content file according to the initial URL of the content file and the version parameter of the current version of the website, where the current URL includes a path information part and a search part, the path information part includes the original path information of the content file, and the search part includes the version parameter of the current version of the website; and returning an access response to the client, where the access response carries the current URL of the content file.

According to the foregoing manner, when a client accesses a page of a website, a web server obtains an initial URL of a content file included in the to-be-accessed page and a version parameter of a current version of the website, generates a current URL of the content file, and adds the version parameter to a search part of the current URL of the content file, so that the client can obtain the content file from the web server according to the current URL. Therefore, according to this embodiment, when the web server receives the access request from the client, the version parameter is added to the search part of the current URL, returned to the client, of the content file. Therefore, during version upgrade of the website, the content file is updated, and a developer does not need to update a path to the content file, does not need to manually change the URL of the content file, and does not need to update a name of the content file either. This improves website upgrading efficiency. Specifically, on one hand, the filename of the content file does not need to be changed in the upgrading process of the website, and therefore, another file referencing the content file is not affected, and a filename of the another file referencing the content file does not need to be changed either, which avoids a full upgrade of massive files of the website and lowers upgrading risks. On the other hand, in the foregoing upgrading process of the website, the path to the content file does not need to be changed, and therefore, the path to the content file does not need to be rewritten by the developer, which reduces development costs.

In a possible embodiment, a website system further includes a management server. When receiving a version query request sent by the web server, the management server queries the version parameter according to an identifier of the website carried in the version query request, and returns the version parameter to the web server. The management server records the identifier of the website, where the identifier may be a key ID of the website. The management server further records the current version number of the website and the version parameter generated according to the version number.

In a possible embodiment, a function of the management server may be implemented in a form of a management module on the web server. In this case, the web server obtains the version number of the current version of the website, and generates the version parameter according to the version number.

In a possible embodiment, the web server uses the version number of the current version of the website as the version parameter.

In a possible embodiment, the management server may configure the version number of the website in any one of the following manners: manner 1: when a version of the website is upgraded, the web server may write a version number of the website after upgrading into a version description file, where the management server extracts a latest version number of the website from the version description file; manner 2: the website is upgraded by operation and maintenance personnel, and after completion of the upgrade, a latest version number of the website is written into the management server by using an interface of the management server; manner 3: the website may be upgraded by using an upgrade script file, and the website system further includes an upgrade management module, where the upgrade management module executes the upgrade script file, and after the upgrade of the website is complete and a content file of the website is updated, a management server interface is called, and the version number of the website is configured on the management server; or manner 4: a configuration management tool of the website system may monitor the web server, and when detecting that a version of the website is updated, read an updated version number of the website from a version repository, call an interface of the management server, and configure the updated version number of the website on the management server. This application provides the foregoing four manners to enable the management server to obtain a latest version number of the website in a timely manner, and thereby generate a version parameter corresponding to the latest version number.

In a possible embodiment, a function of the management server is implemented in a form of a management module on the web server. In this case, the web server may obtain the version number of the website to generate the version parameter of the current version of the website, by using a method similar to the foregoing manners: manner 1: obtaining a version description file of the website, and reading the version number of the current version of the website from the version description file; manner 2: receiving the version number of the current version of the website that is written by operation and maintenance personnel by using a management interface; manner 3: executing an upgrade script file, and after completion of a website upgrade, configuring the version number of the current version of the website; or manner 4: monitoring a version upgrade process of the website, and after completion of a website version upgrade is determined, reading the version number of the current version of the website from a version repository.

In a possible embodiment, the initial URL of the content file is carried in an index file, and the web server replaces the initial URL of the content file included in the index file with the generated current URL, and adds an updated index file to the access response.

In a possible embodiment, the client side caches a filename and a version parameter of the content file that were stored when the client accessed the website before. A location for caching may be the client or another storage device that is connectable to the client. The client queries the cached filename and version parameter of the content file to determine whether the content file included in the to-be-accessed page has been cached. If yes, the cached content file is directly read; if not, a file request message is originated to the web server to obtain the content file from the web server. By means of cache setting, when the browser client accesses the website again, if already stored in a cache, the content file included in the to-be-accessed page does not need to be obtained from the web server again. This improves the website accessing efficiency.

In a possible embodiment, the web server may control a cache attribute of the content file on the browser client side, and specifically, the web server adds to the access response a cache setting parameter that is used to indicate whether the browser client side needs to cache the content file and cache duration.

In a possible embodiment, the web server determines a file type of the index file carried in the access response, and determines, according to the file type of the index file, whether the index file includes the initial URL of the content file. Specifically, when the file is a css file or an html file, the index file includes the initial URL of the content file.

In a possible embodiment, the browser client may support an AJAX technology, and may obtain the content file from the web server in an asynchronous data transfer manner. In this case, a cookie of the access response carries the version parameter of the current version of the website. The client reads the version parameter preferentially from the cookie, adds the version parameter to a request address, generated on the client, of the content file, and obtains the content file from the web server.

According to another implementation, website access method is provided. The method is executed by a proxy server, by intercepting an access response returned by a web server to update a URL of a content file carried in the access response. Specifically, the method includes: intercepting a first access response from a web server, where the first access response is sent after the web server receives an access request from a client, the access request indicates a to-be-accessed page on a website, the first access response carries an initial URL of a content file included in the to-be-accessed page, and the initial URL includes original path information of the content file; obtaining a version parameter of a current version of the website, where each version of the website is corresponding to one upgrade of the website, and each version of the website is corresponding to a unique version parameter; generating a current URL of the content file according to the initial URL of the content file and the version parameter of the current version of the website, where the current URL includes a path information part and a search part, the path information part includes the original path information of the content file, and the search part includes the version parameter of the current version of the website; and returning a second access response to the client, where the second access response carries the current URL of the content file.

According to the foregoing website access method provided in this embodiment, a proxy server intercepts an access response returned by a web server, and adds a version parameter of a current version of the website to a search part of a URL of a content file included in the access response, so that a client can obtain the content file from the web server according to a current URL. During version upgrade of the website, a developer does not need to change a path to a content file, does not need to manually change a URL of the content file, and does not need to update a name of the content file either. This improves website upgrading efficiency. On one hand, the filename of the content file does not need to be changed in the upgrading process of the website, and therefore, another file referencing the content file is not affected, and a filename of the another file referencing the content file does not need to be changed either, which avoids a full upgrade of massive files of the website and lowers upgrading risks. On the other hand, in the foregoing upgrading process of the website, the path to the content file does not need to be changed, and therefore, the path to the content file does not need to be rewritten by the developer, which reduces development costs.

In a possible embodiment, a website system further includes a management server. When receiving a version query request sent by the proxy server, the management server queries the version parameter according to an identifier of the website carried in the version query request, and returns the version parameter to the proxy server. The management server records the identifier of the website, where the identifier may be a key ID of the website. The management server further records the current version number of the website and the version parameter generated according to the version number.

In a possible embodiment, a function of the management server may be implemented in a form of a management module on the proxy server. In this case, the proxy server obtains the version number of the current version of the website, and generates the version parameter according to the version number.

In a possible embodiment, the proxy server uses the version number of the current version of the website as the version parameter.

In a possible embodiment, the proxy server may obtain the version parameter of the current version of the website in any one of the following manners: manner 1: obtaining a version description file of the website, and reading the version number of the current version of the website from the version description file; manner 2: receiving the version number of the current version of the website that is written by operation and maintenance personnel by using a management interface; manner 3: executing an upgrade script file, and after completion of a website upgrade, configuring the version number of the current version of the website; or manner 4: monitoring a version upgrade process of the website, and after completion of a website version upgrade is determined, reading the version number of the current version of the website from a version repository.

In a possible embodiment, the initial URL of the content file is carried in an index file in the first access response returned by the web server, and the proxy server replaces the initial URL of the content file included in the index file with the generated current URL, and adds an updated index file the second access response that is sent to the client.

In a possible embodiment, the second access response includes a cache setting parameter that is used to indicate whether the client needs to cache the content file and cache duration.

In a possible embodiment, the proxy server may further determine a file type of the index file, in the first access response, corresponding to the to-be-accessed page, and determines, according to the file type of the index file, whether the index file includes the initial URL of the content file. When the index file is a css file or an html file, the index file includes the initial URL of the content file.

In a possible embodiment, a browser client may support an AJAX technology, and may obtain a content file from the web server in an asynchronous data transfer manner. In this case, a cookie of the second access response carries the version parameter of the current version of the website.

In a possible embodiment, the function of the proxy server may be integrated into an existing Nginx or HAProxy. Further, the proxy server may be deployed together with the management server or the web server on one physical server. When the proxy server is deployed together with another server, the proxy server may be one of functional modules.

According to still another embodiment, an embodiment further provides another website access method. The method is executed by a client, including: sending an access request to a web server, where the access request indicates a to-be-accessed page on a website; receiving a returned access response, where the access response carries a current URL of a content file included in the to-be-accessed page, the current URL includes a path information part and a search part, the path information part includes original path information of the content file, and the search part includes a version parameter of a current version of the website; and sending a file request message to the web server so as to obtain the content file, where the file request message carries the current URL of the content file.

When the client accesses a page of a website, a search part of a current URL that is of a content file of the to-be-accessed page and that is carried in an access response returned by the web server includes a version parameter of the website, and therefore the client can obtain a latest content file from the web server according to the current URL.

In a possible embodiment, the client caches a received content file, and specifically, stores a filename and a version parameter of the content file that were obtained when the website was accessed before. When accessing a website, the client determines, according to a filename and a version parameter in a current URL of a received content file, whether the content file has been cached locally. If cached, the content file does not need to be obtained from the web server. Still further, the client may directly store the current URL of the received content file without differentiating a version parameter. When content file querying is required, a to-be-obtained URL and the stored URL are directly compared to determine whether a content file corresponding to the to-be-obtained URL has already been cached locally.

The client caches a content file received at an earlier access, and records a filename and a version parameter of the content file. When accessing a page of a website, after receiving a URL of a content file included in the to-be-accessed page, the client determines whether the content file corresponding to the URL has already been cached locally. After the website is upgraded, the version parameter of the current version of the website changes. In this case, a version parameter in a URL of the content file received by the client is different from a version parameter of the locally cached content file, and the client needs to download the content file after the website is upgraded from the website again. According to the foregoing procedure, a problem in content file cache updating on the client side after the website is upgraded is resolved.

In a possible embodiment, a cookie of the access response carries the version parameter, and the current URL includes a URL of a first JavaScript (JS) file. Correspondingly, the method further includes: obtaining, by the client, the version parameter from the cookie, executing the first JS file, and creating an XmlHttpRequest object, where a destination URL in the XmlHttpRequest object includes original address information of a second JS file and the version parameter, the XmlHttpRequest object is used for obtaining the second JS file from the web server, and the second JS file is referenced by the first JS file. According to the foregoing manner, when an AJAX technology is used, if a first JS file included in an index file returned by a website system side references a second JS file, the client needs to construct an XmlHttpRequest object and obtain the second JS file from a web server again.

According to another embodiment, an embodiment provides a web server, where the web server specifically implements the functions of the web server in the foregoing methods. The functions may be implemented by using hardware, or may be implemented by using hardware executing corresponding software. The hardware or software includes one or more modules corresponding to the foregoing functions.

According to another embodiment, an embodiment provides a proxy server, where the proxy server specifically implements the functions of the proxy server in the foregoing methods. The functions may be implemented by using hardware, or may be implemented by using hardware executing corresponding software. The hardware or software includes one or more modules corresponding to the foregoing functions.

According to still another embodiment, an embodiment provides a client, where the client specifically implements the functions of the client in the foregoing methods. The functions may be implemented by using hardware, or may be implemented by using hardware executing corresponding software. The hardware or software includes one or more modules corresponding to the foregoing functions.

In a possible embodiment, the foregoing web server, the proxy server, and the client may be implemented by using a hardware apparatus, which specifically includes a processor and a memory, where the processor is configured to support corresponding functions of the web server, the proxy server, and the client for executing the foregoing methods. The web server, the proxy server, and the client may further include a memory, where the memory is configured for coupling to the processor, and stores program instructions and data required for the processor to execute the foregoing functions.

According to still another embodiment, an embodiment provides a computer storage medium, configured to store computer software instructions used by the foregoing web server, where the computer storage medium contains a program designed for executing the foregoing embodiments.

According to still another embodiment, an embodiment provides a computer storage medium, configured to store computer software instructions used by the foregoing proxy server, where the computer storage medium contains a program designed for executing the foregoing embodiments.

According to still another embodiment, an embodiment provides a computer storage medium, configured to store computer software instructions used by the foregoing client, where the computer storage medium contains a program designed for executing the foregoing embodiments.

Compared with the prior art, according to the website access method, the apparatus, and the website system provided in this application, during version upgrade of a website, a developer does not need to manually update a URL of a content file, and does not need to concern about naming and updating of the content file either, which improves website upgrading efficiency. Further, updating of some content files does not affect other files, and therefore a full upgrade of the website is not required and upgrading risks are lowered.

BRIEF DESCRIPTION OF DRAWINGS

To describe the technical solutions in the embodiments more clearly, the following briefly describes the accompanying drawings required for describing the embodiments. The accompanying drawings in the following description merely show some embodiments, and a person of ordinary skill in the art can derive other implementation embodiments from these accompanying drawings. All of these embodiments or implementation manners shall fall within the protection scope.

DESCRIPTION OF EMBODIMENTS

Figure 1A:
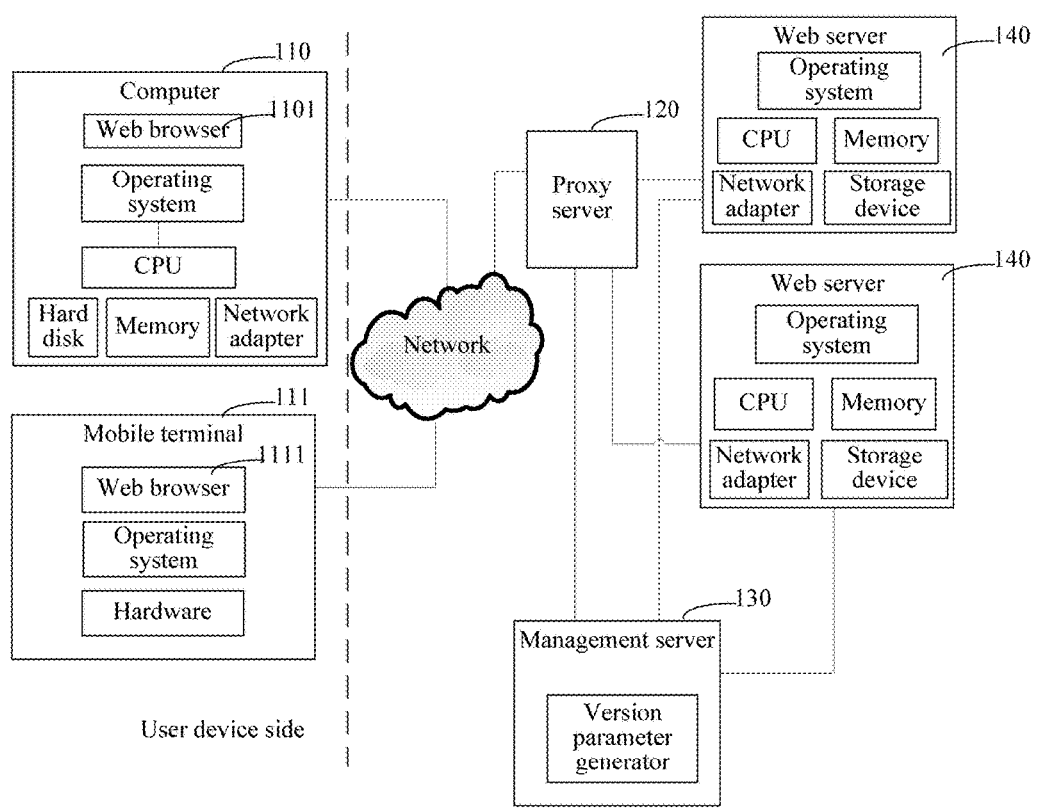
FIG. 1A is a schematic structural diagram of an example system for implementing the present invention.

In various embodiments, a web server is configured to deploy a web application program and store a resource file. Multiple web servers may constitute a web server cluster to implement a website. Files stored on the web server are generally referred to as resource files, including an application-specific configuration file, a web page template, and the like. Application computer program code may access these files by using a file system. A content file mentioned in various embodiments is generally a static resource file hosted on a web server. The static resource file is consistent for all users, and generally does not change in normal circumstances when an application program runs. The content file may include a website media file (such as an image), a cascading style sheet (css) file for describing how to create a web page on a screen, JavaScript code that can be downloaded and executed by a browser, an HTML page that includes no dynamic content, and the like. When an HTTP request is received by a web server, the web server returns to a requesting client an HTML corresponding to the HTTP request and an address of a content file referenced by the HTML.

In various embodiments, both a deployment process and a front-end of the website need to know which files of an application program are static resource files. The deployment process sends the static resource files to the web server, and the front-end stores URL paths to the static resource files, so that the front-end can route requests on the URL paths to the static resource files to an appropriate web server. In various embodiments, a proxy server can implement the function of the front-end.

Various elements of embodiments described herein are:

Client: A web browser runs on the client, and therefore, the client is also referred to as a browser client. The browser client can communicate with a proxy server and a web server by using a network, and the browser client is configured to originate an HTTP request. The client can be a hand-held device, an in-vehicle device, a wearable device, other types of computing devices or other processing devices connected to various types of networks, where the devices can be provided with wireless communication capability. The client may also be a mobile station (MS), a terminal, terminal equipment, and the like Web server: The web server is configured to deploy a web application program and store a content file (that is, a static resource file), and the web server can communicate with a management server and a proxy server. There may be one or more web servers, and multiple web servers can constitute a web server cluster. When receiving an access request sent by a browser client, the proxy server may perform load balancing to select an appropriate web server from the web server cluster to serve the browser client.

Proxy module: The proxy module may implement querying of a version parameter of a content file and a URL update of the content file. Optionally, the proxy module may further update cookie content in an access response sent by a web server. In an example, the proxy module may be connected to a management module, and obtain a version parameter of a current version of the website from the management module.

Management module: The management module is configured to provide a website version management function and a version parameter generation function. The version parameter generation function may be implemented by a version generator in the management module. A version parameter is used to indicate a current version of a website, which may be a parameter in any format or in any form provided that a version of a website can be identified uniquely. A version number of a website may be directly used as a specific version parameter, or a random code is generated according to a version number of the website and is used as a version parameter of a current version of the website. A specific form of the version parameter is not limited in the embodiments. The management module stores the version number of the current version of the website, and returns, when receiving a file query request that is sent by the proxy module, the version parameter corresponding to the current version of the website. When the website is upgraded, the management module obtains the version number of the current version of the website in various embodiments. The management module records identifiers of websites, where one website identifier corresponds to one website and may be used to uniquely identify the website. Each version of the website corresponds to one upgrade of the website, and each version of the website corresponds to a unique version parameter.

The foregoing proxy module and management module may be implemented on a web server in a form of functional modules, or may be implemented on independent physical servers. When being implemented in a form of an independent physical server, the proxy module may be referred to as a proxy server. When being implemented in a form of an independent physical server, the management module may be referred to as a management server. The embodiments focus on functions of the proxy module and the management module. A person skilled in the art may understand that the functions of the proxy module and the management module may be implemented on another server, which is not limited in the embodiments. In an example, the proxy server is deployed on a web server front-end, and may be used as a load balancer for processing HTTP requests for the web server. The function of the proxy server may be integrated into an existing Nginx or HAProxy.

FIG. 1A is a schematic structural diagram of an example website system according to an embodiment of the present invention. A client (110; 111) is connected to a web server 140 by using a network, a web browser (1101; 1111) is installed on the client (110; 111), a proxy server 120 is located between the client (110; 111) and the web server 140, and a management server 130 is configured to manage website version information. In this example, the web server 140, the proxy server 120, and the management server 130 are distributed on different physical servers.

Figure 1B:
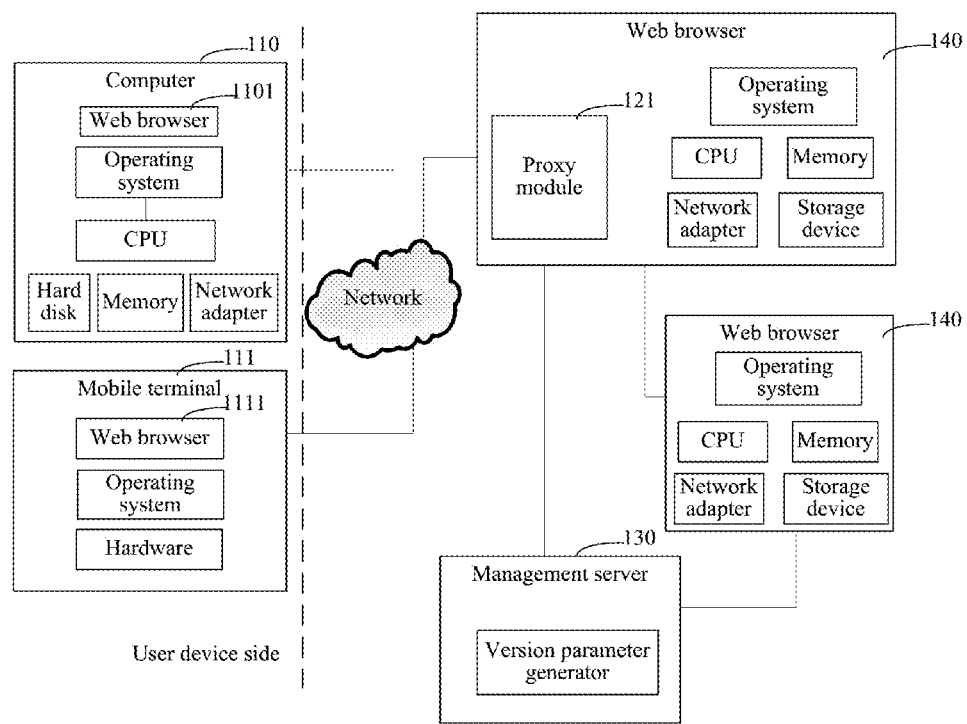
FIG. 1B is schematic structural diagram of another example system for implementing the present invention.

FIG. 1B is a schematic structural diagram of another example website system according to an embodiment. In this example, a proxy server in a form of a proxy module 121 is deployed together with one web server 140 in a web server cluster.

Figure 1C:
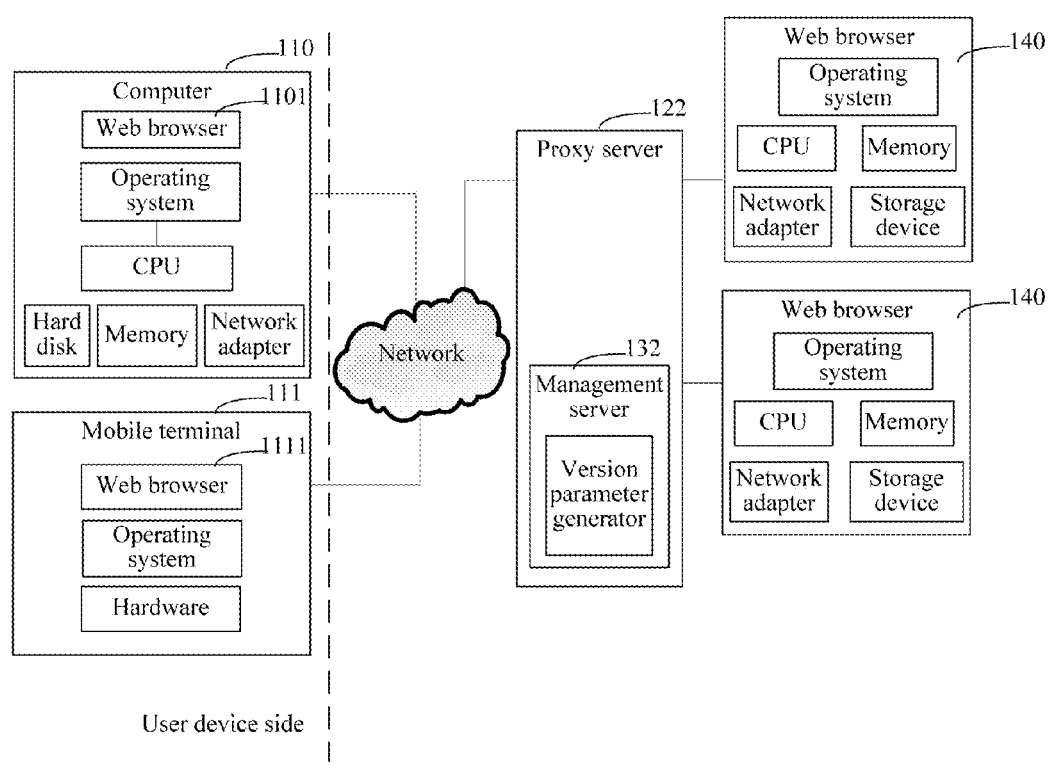
FIG. 1C is schematic structural diagram of another example system for implementing the present invention.

FIG. 1C is a schematic structural diagram of still another example website system according to an embodiment. A management server in a form of a management module 132 is deployed together with a proxy server 122. It should be noted that the embodiments do not strictly limit a specific hardware implementation manner of a website system, provided that elements in the system can implement corresponding functions in the embodiments.

Figure 2:
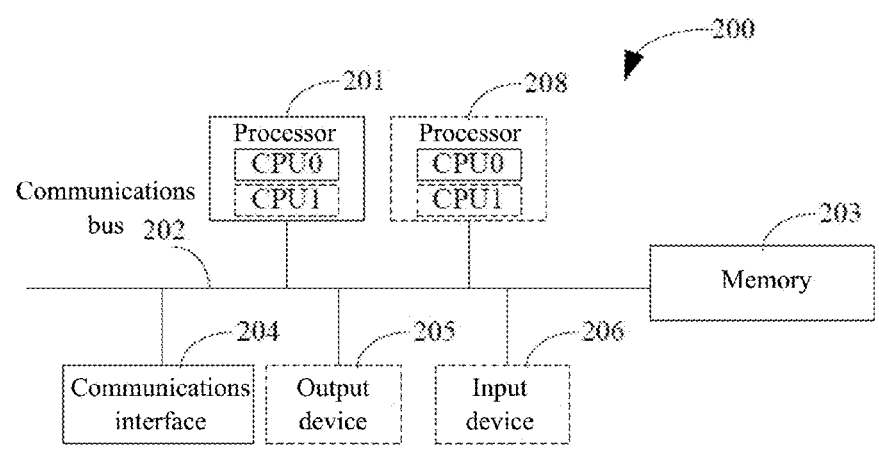
FIG. 2 is a schematic diagram of an example computer device according to an embodiment of the present invention.

FIG. 2 is a schematic diagram of a computer device according to an embodiment. The computer device 200 includes at least one processor 201, a communications bus 202, a memory 203, and at least one communications interface 204.

The processor 201 may be a general purpose central processing unit (CPU), a microprocessor, an application-specific integrated circuit (ASIC), or one or more integrated circuits for controlling execution of a solution program.

The communications bus 202 may include a path for information transfer between the foregoing components. The communications interface 204 uses any transceiver like apparatus to communicate with another device or a communications network, such as an Ethernet network, a radio access network (RAN), a wireless local area network (WLAN).

The memory 203 may be a read-only memory (ROM) or another type of static storage device for storing static information and instructions, a random access memory (RAM) or another type of dynamic storage device for storing information and instructions, an electrically erasable programmable read-only memory (EEPROM), a compact disc read-only memory (CD-ROM) or another optical disk storage, an optical disc storage (including a compact disc, a laser disc, an optical disc, digital versatile disc, a Blu-ray optical disc, and the like), a magnetic disk storage medium or another magnetic storage device, or any other computer-accessible medium that can be used to carry or store expected program code in an instruction or data structure form, but is not limited thereto. The memory may exist independently, and is connected to the processor by using the bus. The memory may be integrated with the processor.

The memory 203 is configured to store application program code of a solution, and the processor 201 controls execution. The processor 201 is configured to execute the application program code stored in the memory 203.

In an embodiment, the processor 201 may include one or more CPUs, for example, a CPU0 and a CPU1 in FIG. 2.

In specific implementation, in an embodiment, the computer device 200 may include multiple processors, for example, the processor 201 and a processor 208 in FIG. 2. Each of the processors may be a single-core processor (single-CPU), or may be a multi-core processor (multi-CPU). The processors herein may be one or more devices, circuits, and/or processing cores for processing data (for example, computer program instructions).

In specific implementation, in an embodiment, the computer device 200 may further include an output device 205 and an input device 206. The output device 205 communicates with the processor 201, and may display information in multiple manners. For example, the output device 205 may be a liquid crystal display (LCD), a light emitting diode (LED) display device, a cathode ray tube (CRT) display device, a projector (projector), or the like. The input device 206 communicates with the processor 201, and may receive a user input in multiple manners. For example, the input device 206 may be a mouse, a keyboard, a touchscreen device, a sensor device, or the like.

The foregoing computer device 200 may be a general purpose computer device or a dedicated computer device. In various embodiments, the computer device 200 may be a desktop computer, a portable computer, a network server, a palmtop computer, a mobile phone, a tablet computer, a wireless terminal device, a communications device, an embedded device, or a device with a structure similar to the structure in FIG. 2. Other types of computer devices are possible.

The web server, the proxy server, the management server, and the client in FIG. 1A, FIG. 1B, and FIG. 1C may be implemented by the device shown in FIG. 2. The memory stores one or more software modules for implementing functions of the web server, the management server, and the client (for example, a website version management function and a version parameter generation function in the management server). The web server, the proxy server, the management server, and the client may implemented, by using a processor and program code stored in a memory.

It should be noted that the computer device shown in FIG. 2 provides only a possible hardware implementation manner of elements in a website system. Hardware components of the computer device may be added or removed according to differences or changes of functions of the elements in the system, so as to match the functions of the elements in the system.

In the foregoing website system, a web server stores a static resource file of a website. A proxy server intercepts an access response that is returned to a browser client by the web server, and adds, to a current URL of a static resource file included in a to-be-accessed page, a version parameter corresponding to a current version number of the website. The proxy server returns the current URL to the browser client. By using the solution provided herein, the browser client can obtain the static resource file from the web server according to the current URL. During a version upgrade of the website, a developer does not need to change a path to a static resource file, does not need to manually update a URL of the resource file, and does not need to update a name of the static resource file either. This improves website upgrading efficiency. On one hand, the filename of the static resource file does not need to be changed in the upgrading process of the website, and therefore, another file referencing the static resource file is not affected, and a filename of the another file referencing the static resource file does not need to be changed either, which avoids a full upgrade of files of the website and lowers upgrading risks. On the other hand, in the foregoing upgrading process of the website, the path to the static resource file does not need to be changed, and therefore, the path to the static resource file does not need to be rewritten by the developer, which reduces development costs.

Figure 3:
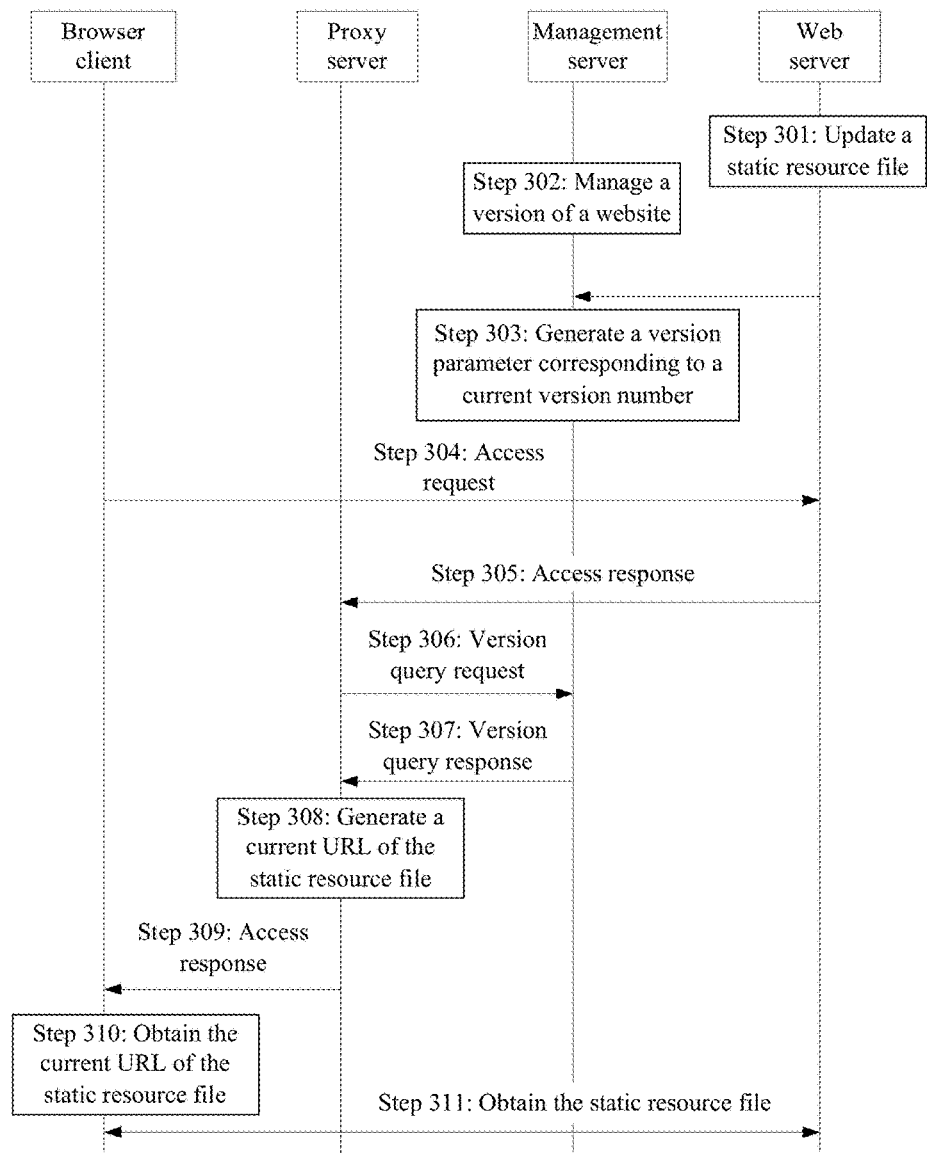
FIG. 3 is a schematic flowchart of an example method for accessing a web server by a browser client according to an embodiment of the present invention.

FIG. 3 is a schematic flowchart of a method for accessing a web server by a browser client according to an embodiment, including:

Step 301. Update a static resource file of a website.

When the website is upgraded, updated static resource files are deployed on a web server of the website, and a current version number of the website is determined.

Step 302. A management server manages a version of the website, and records a current version number of the website.

It should be noted that in specific solution implementation, the management server may obtain the version number of the current version of the website in any one of the following manners:

Manner 1: Executing an upgrade script file. The upgrade script runs on the web server or another independent server, and the version number of the website is configured in the upgrade script file. In a process of upgrading the website, by running the upgrade script file, the website in the web server is first upgraded to update the static resource file, and then the upgrade script file calls an interface of the management server to configure, on the management server, a latest version number of the website.

Manner 2: Manual execution. Operation and maintenance personnel upgrade the website, by updating the static resource file on the web server of the website, and writing a latest version number of the website in a management window by using an interface provided by the management server.

Manner 3: Configuring a management tool. The management tool may be used to monitor the upgrading process of the website and automatically obtain an upgraded version number of the website from a version repository, or the management tool may directly monitor changing of the website version number in the web server. There may be many versions in the version repository for a same website. The management tool may use multiple manners to obtain a latest version that the website is upgraded to, including but not limited to pre-defining a version number definition rule, matching upgrade start time, and the like.

Manner 4: The web server stores a version description file for describing a current version of the website. The management server may obtain the version description file to extract the version number of the website.

Step 303. The management server generates a version parameter corresponding to the version number of the current version of the website, and records a correspondence between an identifier, the version number, and the version parameter of the website, where the identifier of the website is a unique identifier of the website on the management server.

It should be noted that the version number of the current version of the website may directly be used as the version parameter. A specific implementation form of the version parameter is not limited in this embodiment.

Step 304. A browser client sends an access request to the web server, where the access request is sent to the web server by using a proxy server.

In an example, a user enters an address of a to-be-accessed page of the website in a browser client window, the browser client sends an HTTP request to the web server of the website, where the HTTP request is used to indicate the to-be-accessed page, and an address in the HTTP request is the address of the to-be-accessed page. The web server provides a web service for the to-be-accessed website, and a static resource file included in the to-be-accessed page is stored in the web server.

In an example, the website may be deployed on one web server or deployed in a web server cluster constituted by multiple servers. The proxy server may be used to perform load balancing for HTTP requests, so as to select an appropriate web server for the HTTP requests.

Step 305. The web server returns a first access response to the browser client by using the proxy server, where the first access response comprises an index (index) file, and the index file includes an initial URL of a static resource file included in the to-be-accessed page.

In this embodiment, a URL in the index file returned by the web server is the initial URL of the static resource file included in the to-be-accessed page, where the initial URL includes original path information of the static resource file. It should be noted that the original path information may be an absolute address or a relative address of the static resource file, which is not limited in this embodiment. The original path information does not include version information of the website, that is, an upgrade of the website does not cause a change to the original path information.

Step 306. The proxy server intercepts the first access response, and sends a version query request to the management server, where the version query request carries the identifier of the website for querying the version parameter corresponding to the version number of the current version of the website.

In an example, the proxy server does not intercept all files returned by the web server to the browser client. The proxy server determines, according to a file type of a file returned by the web server, whether to perform interception, and only a file that carries the URL of the static resource file is intercepted. Specifically, the proxy server determines a file type of the index file carried in the first access response. When the file is a css file or an HTML file, the first access response is intercepted. When the file is not a css file or an HTML file, the first access response is transparently transmitted to the browser client.

In another example, the proxy server implements a function of a version server. In this case, the proxy server generates the version parameter of the current version of the website or directly uses the version number of the current version of the website as the version parameter.

Step 307. The management server queries, according to the identifier of the website carried in the version query request, the correspondence between the identifier of the website and the version number and version parameter of the website to obtain the version parameter corresponding to the current version number of the website, and returns a version parameter query response to the proxy server, where the version parameter query response carries the version parameter.

Step 308. The proxy server receives the version parameter query response, and generates a current URL of the static resource file according to the original URL of the static resource file and the version parameter of the current version of the website, where the current URL includes a path information part and a search part, the path information part includes original path information of the content file, and the search part includes the version parameter of the current version of the website.

The proxy server replaces the initial URL of the static resource file included in the index file with the generated current URL.

Exemplarily, a structure of a URL is described in this embodiment. According to the definition (link: https://www.ietf.org/rfc/rfc1738.txt) in the RFC 1738 standard, a format of a URL is as follows:

http: //<host>:<port>/<path>?<searchpart> where <host> represents a domain name or an IP address, <port> is a port number, <path> is a path information part that may be used for indicating a path for obtaining a static resource file, and <searchpart> is a search part representing a URL parameter. "?" represents a start point of the search part, separating the search part from the path information part. In this embodiment, the version parameter is carried in the search part in the foregoing URL format, and therefore, a path for obtaining of the static resource file is not affected. When the website is upgraded, the path information part does not change, and therefore, a developer does not need to update paths to static resource files, and does not need to change filenames of the static resource files either. This reduces development costs.

Exemplarily, in a specific implementation manner, an original URL of an index file is <link src="theme/logo.gif">, and the proxy server replaces the original URL with <link src="theme/logo.gif?ttl=345672">, where the string 345672 is a version parameter corresponding to a current version of a website on which the static resource file logo.gif is located, and the string may be generated by performing hash on a version number.

Step 309. The proxy server returns a second access response to the browser client, where the second access response carries an updated index file, and the updated index file includes the current URL of the static resource file.

Step 310. The browser client receives the second access response, and extracts the updated URL of the static resource file.

Step 311. The browser client sends a file obtaining request to the web server, where the file obtaining request carries the updated URL of the static resource file, to request the static resource file from the web server. The web server receives the file obtaining request, extracts the static resource file according to the current URL of the static resource file, and returns the static resource file to the browser client.

In an example, the browser client may further cache a received static resource file locally, recording a filename and a version parameter of the static resource file. Further, when accessing the website again, after obtaining a URL of a static resource file included in a to-be-accessed page, the browser client may further determine, according to a filename and a version parameter included in the URL of the static resource file, whether the to-be-read static resource file has been cached locally. If cached, the to-be-read static resource file does not need to be obtained from the web server again. This improves the speed of website accessing.

Further, by using a mechanism in which the HTTP protocol supports caching, the first access response further includes a cache setting parameter that is used to indicate whether the browser client side needs to cache the static resource file and cache duration. Specifically, the cache setting parameter may be a parameter cache and/or expire, and cache setting is based on the definition in the HTTP protocol. The second access response that is sent to the browser client by the proxy server also carries the cache setting parameter. The cache setting parameter carries a recommended value of a cache expiration time. If the browser client selects to accept this recommended value, the static resource file is cached for duration that is corresponding to the recommended value. Within this duration, a local copy of the static resource file is directly used and the static resource file does not need to be obtained from the web server again. This reduces the consumption of network bandwidth. After the website is upgraded, the version parameter corresponding to the static resource file changes. The browser client may determine, according to a filename and a version parameter of the static resource file that are included in a received URL, that the locally stored static resource file has expired. In this case, the foregoing procedure for obtaining the static resource file needs to be executed to update the locally cached static resource file.

In this embodiment, a proxy server is added between a browser client and a web server, to implement interception of and modification to an access response from the web server. Different from the prior art in which a filename is updated based on a hash value of file content, in this embodiment, the proxy server updates, based on a version parameter of a website, a current URL of a static resource file accessed by the browser client, adds the version parameter to a search part of the current URL, provides for the browser client an updated static resource file when the website is upgraded, and updates a file cached on the browser client side. In a version upgrade process of the website, a developer does not need to change a path to a static resource file, does not need to manually update a URL of the resource file, and does not need to update a name of the static resource file either. This improves website upgrading efficiency. On one hand, the filename of the content file does not need to be changed in the upgrading process of the website, and therefore, another file referencing the content file is not affected, and a filename of the another file referencing the content file does not need to be changed either, which avoids a full upgrade of large numbers of files of the website and lowers upgrading risks. On the other hand, in the foregoing upgrading process of the website, the path to the content file does not need to be changed, and therefore, the path to the content file does not need to be rewritten by the developer, which reduces development costs.

In various embodiments, a home page (Home.html) of the website is not cached. When the browser client needs to log in to the home page of the website, an index file corresponding to the home page always needs to be obtained from the web server. When a version of the website is updated, the browser client can obtain a latest static resource file.

The proxy server is also referred to as a layer 7 load balancer. For example, an existing Nginx and an existing HAProxy can both provide such a service.

Further, in an example, the browser client may support Asynchronous JavaScript And Extensible Markup Language (AJAX). On a conventional web page (without an AJAX technology used), if page content needs to be updated, an entire web page needs to be reloaded even if only a part of web page content changes. However, for the AJAX technology, asynchronous data transfer is used between the browser client and the web server, and an update may be performed on a part of web page content without an entire web page reloaded. In this way, a volume of data downloaded from the server can be reduced for the web page.

AJAX is a web development technology for creating interactive web page applications. The browser client side can include an AJAX engine, where the AJAX engine may obtain a static resource file from the web server by using an XmlHttpRequest object.

In an example, the AJAX engine runs a JavaScript (JS) file to create an XmlHttpRequest object. The XmlHttpRequest object includes an HTTP method (Get/Post), a destination URL, and a callback function, where the destination URL is a URL of the to-be-obtained static resource file. It should be noted that, in this application, the method for creating an XmlHttpRequest object by the AJAX engine by using JavaScript may be a common method in the existing AJAX technology, which is not limited in this application In various embodiments, step 309 may further include: the proxy server adds, to a cookie of the second access response, the version parameter corresponding to the current version of the website, where the updated index file carried in the second access response includes a filename of a first JS file. Step 310 may further include: an AJAX engine executes the first JS file to create an XmlHttpRequest object, where a destination URL in the XmlHttpRequest object includes a filename of a second JS file and the version parameter, the XmlHttpRequest object is used for obtaining the second JS file from the web server, and the second JS file is referenced by the first JS file.

According to the foregoing manner, when a browser client supports an AJAX technology, and a first JS file included in an index file that is returned by a web server needs to reference a second JS file, an AJAX engine of the browser client constructs an XmlHttpRequest object, and adds a version parameter to a destination URL of the second JS file carried in the XmlHttpRequest object, so that the second JS file obtained after the website is upgraded can be obtained from the web server. This resolves a problem in obtaining and cache updating of a static resource file in a case of an AJAX request.

In an example, when the website is upgraded, a static resource file stored on the web server is updated. When the browser client sends an access request to the web server for the first time, a static resource file included in a to-be-accessed page is downloaded automatically, and a local cache is updated. In a subsequent request, when a static resource file included in a page to be subsequently accessed has already been cached locally, the browser client does not originate, to the web server, a file obtaining request with respect to the static resource file. Therefore, addition of the version parameter based on the proxy server is executed only when the website is upgraded or when the cache has expired. Therefore, this embodiment can provide very good website response performance and a very good concurrency capability.

Figure 4:
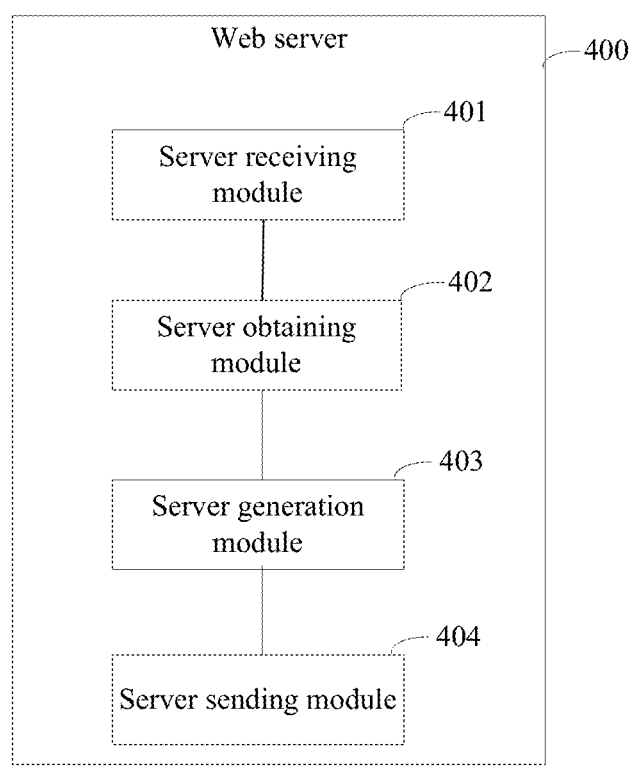
FIG. 4 is a schematic structural diagram of an example web server according to an embodiment of the present invention.

FIG. 4 is a schematic structural diagram of aan example web server according to an embodiment. The web server 400 includes: a server receiving module 401, a server obtaining module 402, a server generation module 403, and a server sending module 404.

The server receiving module 401 is configured to receive an access request from a client, where the access request indicates a to-be-accessed page on a website.

The server obtaining module 402 is configured to obtain an initial uniform resource locator URL of a content file included in the to-be-accessed page and a version parameter of a current version of the website, where the initial URL includes original path information of the content file, each version of the website is corresponding to one upgrade of the website, and each version of the website is corresponding to a unique version parameter.

The server generation module 403 is configured to generate a current URL of the content file according to the initial URL of the content file and the version parameter of the current version of the website, where the current URL includes a path information part and a search part, the path information part includes the original path information of the content file, and the search part includes the version parameter of the current version of the website.

The server sending module 404 is configured to return an access response to the client, where the access response carries the current URL of the content file.

Further, the server obtaining module 402 may obtain the version parameter of the current version of the website in multiple manners, which may be specifically as follows:

the server obtaining module 402 is specifically configured to: obtain a version number of the current version of the website, and generate the version parameter according to the version number; or the server obtaining module 402 is specifically configured to: obtain a version number of the current version of the website, and use the version number of the current version of the website as the version parameter; or the server obtaining module 402 is specifically configured to obtain, from a management server, the version parameter of the current version of the website that is returned according to an identifier of the website by the management server.

The server obtaining module 402 is specifically configured to obtain the version number of the current version of the website in any one of the following manners:

manner 1: obtaining a version description file of the website, and reading the version number of the current version of the website from the version description file;

manner 2: receiving the version number of the current version of the website that is written by operation and maintenance personnel by using a management interface;

manner 3: executing an upgrade script file, and after completion of a website upgrade, configuring the version number of the current version of the website; or manner 4: monitoring a version upgrade process of the website, and after completion of a website version upgrade is determined, reading the version number of the current version of the website from a version repository.

The server obtaining module 402 is specifically configured to read an initial URL of the content file included in an index file corresponding to the to-be-accessed page; and correspondingly, the server generation module 403 is further configured to: replace the initial URL of the content file included in the index file with the generated current URL, and add an updated index file to the access response.

Further, the access response returned by the web server to the client can include a cache setting parameter that is used to indicate whether the client needs to cache the content file and cache duration. A cookie of the access response may further carry the version parameter of the current version of the website, so that the client can read the version parameter from the cookie and add the version parameter when a request address of the content file is generated on the client side.

The web server may further include a determining module, configured to determine a file type of the index file corresponding to the to-be-accessed page, and determine, according to the file type of the index file, whether the index file includes the initial URL of the content file. Specifically, when the file is a css file or an HTML file, the index file includes the initial URL of the content file.

Figure 5:
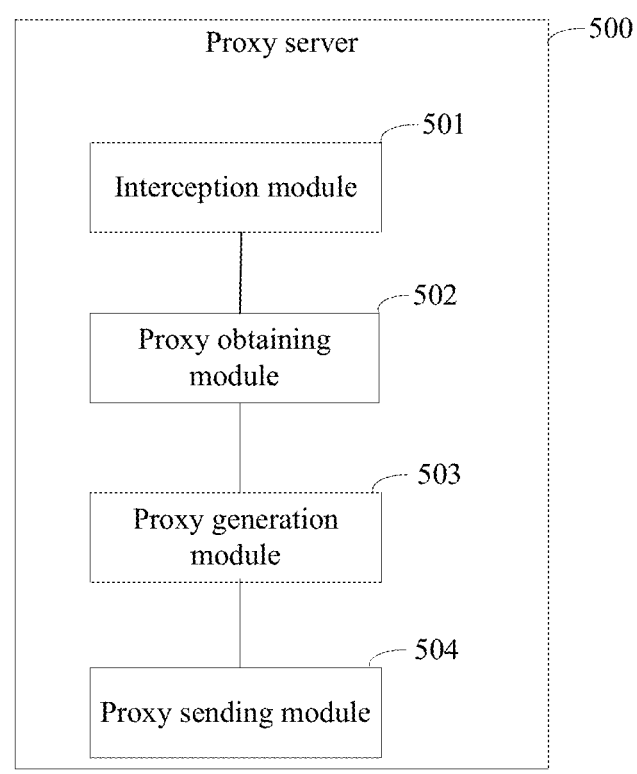
FIG. 5 is a schematic structural diagram of an example proxy server according to an embodiment of the present invention.

As shown in FIG. 5, FIG. 5 is a schematic structural diagram of a proxy server according to an embodiment. The proxy server 500 includes: an interception module 501, a proxy obtaining module 502, a proxy generation module 503, and a proxy sending module 504.

The interception module 501 is configured to intercept a first access response from a web server, where the first access response is sent after the web server receives an access request from a client, the access request indicates a to-be-accessed page on a website, the first access response carries an initial URL of a content file included in the to-be-accessed page, and the initial URL includes original path information of the content file.

The proxy obtaining module 502 is configured to obtain a version parameter of a current version of the website, where each version of the website is corresponding to one upgrade of the website, and each version of the website is corresponding to a unique version parameter.

The proxy generation module 503 is configured to generate a current URL of the content file according to the initial URL of the content file and the version parameter of the current version of the website, where the current URL includes a path information part and a search part, the path information part includes the original path information of the content file, and the search part includes the version parameter of the current version of the website.

The proxy sending module 504 is configured to return a second access response to the client, where the second access response carries the current URL of the content file.

Further, the proxy obtaining module 502 may obtain the version parameter of the current version of the website in multiple manners, which may be specifically as follows:

the proxy obtaining module 502 is specifically configured to: obtain a version number of the current version of the website, and generate the version parameter according to the version number; or the proxy obtaining module 502 is specifically configured to: obtain a version number of the current version of the website, and use the version number of the current version of the website as the version parameter; or the proxy obtaining module 502 is specifically configured to obtain, from a management server, the version parameter of the current version of the website that is returned according to an identifier of the website by the management server.

The proxy obtaining module 502 is specifically configured to obtain the version number of the current version of the website in any one of the following manners:

manner 1: obtaining a version description file of the website, and reading the version number of the current version of the website from the version description file;

manner 2: receiving the version number of the current version of the website that is written by operation and maintenance personnel by using a management interface;

manner 3: executing an upgrade script file, and after completion of a website upgrade, configuring the version number of the current version of the website; or manner 4: monitoring a version upgrade process of the website, and after completion of a website version upgrade is determined, reading the version number of the current version of the website from a version repository.

The initial URL of the content file is included in an index file of the first access response; and correspondingly, the proxy generation module 503 is further configured to: replace the initial URL of the content file included in the index file with the generated current URL, and add an updated index file to the second access response.

Figure 6:
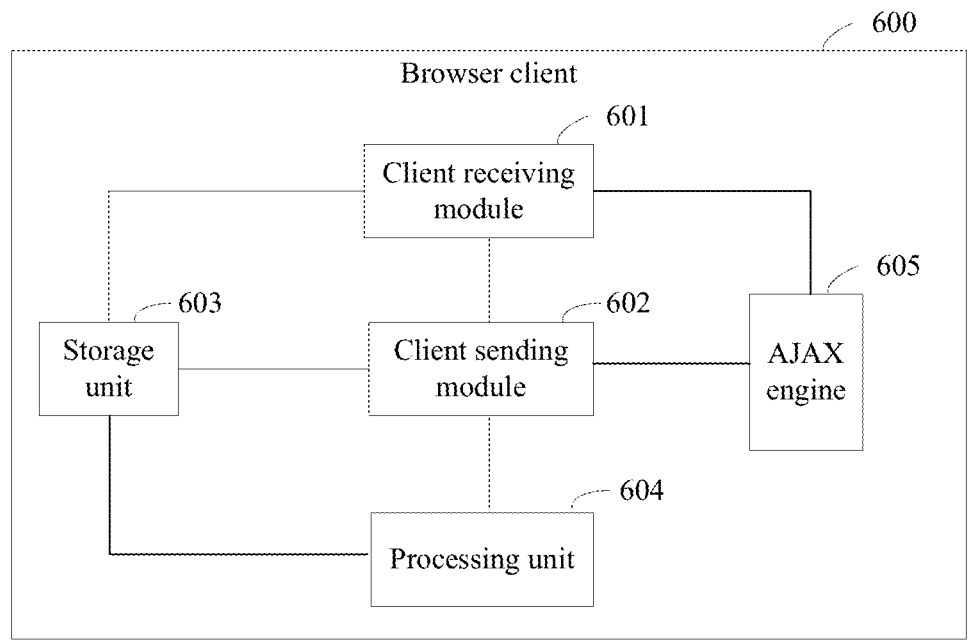
FIG. 6 is a schematic structural diagram of an example browser client according to an embodiment of the present invention.

FIG. 6 is a schematic structural diagram of an example client 600 according to an embodiment, including a client sending module 601 and a client receiving module 602.

The client sending module 601 is configured to send an access request to a web server, where the access request indicates a to-be-accessed page on a website.

The client receiving module 602 is configured to receive a returned access response, where the access response carries a current URL of a content file included in the to-be-accessed page, the current URL includes a path information part and a search part, the path information part includes original path information of the content file, and the search part includes a version parameter of a current version of the website.

The client sending module 601 is further configured to send a file request message to the web server so as to obtain the content file, where the file request message carries the current URL of the content file.

Further, the client may cache a received content file, and specifically, the client further includes:

a storage unit 603, configured to store a filename and a version parameter of the content file that were obtained when the website was accessed before; and a processing unit 604, configured to query, from the storage unit 603, the stored filename and version parameter of the content file;

the client sending module 601 is further configured to send the file request message to the web server when the content file comprised in the to-be-accessed page is not cached.

Further, a cookie of the access response carries the version parameter, and the current URL is specifically a URL of a first JS file.

The client further includes an AJAX engine 605, configured to: obtain the version parameter from the cookie, execute the first JS file, and create an XmlHttpRequest object, where a destination URL in the XmlHttpRequest object includes original address information of a second JS file and the version parameter, the XmlHttpRequest object is used for obtaining the second JS file from the web server, and the second JS file is referenced by the first JS file.

Figure 7:
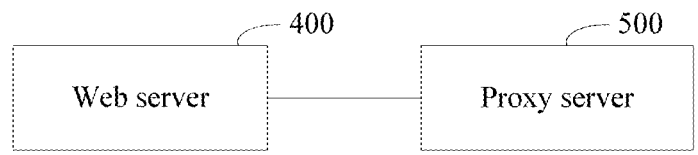
FIG. 7 is a schematic structural diagram of an example website system according to an embodiment of the present invention.

FIG. 7 is an example website system according to an embodiment, including a web server 400 and a proxy server 500.

The web server 400 is configured to: receive an access request from a client, where the access request indicates a to-be-accessed page on a website, and return a first access response to the client, where the first access response carries an initial URL of a content file included in the to-be-accessed page, and the initial URL includes original path information of the content file.

The proxy server 500 is configured to: intercept the first access response, and obtain a version parameter of a current version of the website, where each version of the website is corresponding to one upgrade of the website, and each version of the website is corresponding to a unique version parameter.

The proxy server 500 is further configured to: generate a current URL of the content file according to the initial URL of the content file and the version parameter of the current version of the website, and return a second access response to the client, where the second access response carries the current URL of the content file, the current URL includes a path information part and a search part, the path information part includes original path information of the content file, and the search part includes the version parameter of the current version of the website.

According to the foregoing website access method, the apparatus, and the website system provided in the embodiments, a version parameter of a current version of a website is added to a search part of a URL of a content file included in an access response that is returned to a client, so that the client can obtain the content file from a web server according to the current URL. During version upgrade of the website, a developer does not need to change a path to a content file, does not need to manually change a URL of the content file, and does not need to update a name of the content file either. This improves website upgrading efficiency. On one hand, the filename of the content file does not need to be changed in the upgrading process of the website, and therefore, another file referencing the content file is not affected, and a filename of the another file referencing the content file does not need to be changed either, which avoids a full upgrade of massive files of the website and lowers upgrading risks. On the other hand, in the foregoing upgrading process of the website, the path to the content file does not need to be changed, and therefore, the path to the content file does not need to be rewritten by the developer, which reduces development costs.

In the embodiments corresponding to FIG. 4 to FIG. 7, the web server 400, the proxy server 500, the browser client 600, and the management server are presented in a form of functional units/functional modules. The "unit/module" herein may refer to an ASIC circuit, a processor and a memory for executing one or more software or firmware programs, an integrated logic circuit, and/or another component that can provide the foregoing functions. In a simple embodiment, the web server 400, the proxy server 500, the browser client 600, and the management server may be in a form shown in FIG. 2. For example, the server receiving module 401, the server obtaining module 402, the server generation module 403, and the server sending module 404 may be implemented by using the processor (201; 208) and the memory (203) in FIG. 2, which is specifically implemented by using the processor to execute program code stored in the memory.

An embodiment further provides a computer storage medium, configured to store computer software instructions used by the web server in the foregoing embodiments, where the computer storage medium contains a program designed for executing the foregoing method embodiments. The website access method may be implemented by executing the stored program.

An embodiment further provides another computer storage medium, configured to store computer software instructions used by the foregoing proxy server, where the computer storage medium contains a program designed for executing the foregoing method embodiments. The website access method may be implemented by executing the stored program.

An embodiment further provides another computer storage medium, configured to store computer software instructions used by the foregoing client, where the computer storage medium contains a program designed for executing the foregoing method embodiments. The website access method may be implemented by executing the stored program.

Although the present invention has been described herein with reference to the embodiments, in a process of practicing the present invention claimed for protection, a person skilled in the art can understand and implement, by checking the accompanying drawings, the disclosed content, and the following claims, other changes to the disclosed embodiments.

A person skilled in the art should understand that the embodiments may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in an appropriate medium and provided together with or as part of other hardware, or may also be distributed in other forms, for example, through the Internet or other wired or wireless telecommunication systems.

The present invention is described with reference to the flowcharts and/or block diagrams of the method, the apparatus (device), and the computer program product according to the embodiments. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention has been described with reference to specific features and the embodiments thereof, apparently, various modifications and combinations may be made without departing from the spirit and scope of the embodiments. Correspondingly, the specification and the accompanying drawings are only exemplary descriptions of the embodiments defined by the appended claims, and are considered to cover any and all modifications, changes, combinations or equivalents within the scope. Obviously, a person skilled in the art can make various modifications and variations to the present invention without departing from the spirit and scope of the embodiments. The present invention is intended to cover these modifications and variations provided that they fall within the scope of protection defined by the following claims and their equivalent technologies.

What is claimed is:

1. A website access method, comprising:
   receiving, by a web server, an access request from a client, wherein the access request indicates a to-be-accessed page on a website;
   obtaining, by the web server, an initial uniform resource locator (URL) of a content file for the to-be-accessed page in response to the access request, wherein the initial URL comprises original path information of the content file;
   obtaining, by the web server, a version parameter of a current version of the website, and wherein each version of the website corresponds to a unique version parameter;
   generating, by the web server, a current URL of the content file according to the initial URL of the content file and the version parameter of the current version of the website, wherein the current URL comprises a path information part and a search part, the path information part comprising the original path information of the content file, and the search part comprising the version parameter of the current version of the website;
   returning, by the web server, an access response to the client, wherein the access response carries the current URL of the content file, wherein a cookie of the access response carries the version parameter, and wherein the current URL is a URL of a first JavaScript (JS) file that references a second JS file; and
   receiving, by the web server, a file request message from the client to obtain a JS file, wherein the file request message carries the current URL of the first JS file;
   returning, by the web server, the first JS file to the client in response to the file request message;
   receiving, by the web server, a request for the second JS file from the client; and
   returning, by the web server, the second JS file to the client.

2. The method according to claim 1, wherein the obtaining a version parameter of a current version of the website comprises one of the following:
   obtaining a version number of the current version of the website, and generating the version parameter according to the version number;
   obtaining the version number of the current version of the website, and using the version number of the current version of the website as the version parameter; or
   sending a version query request to a management server, wherein the version query request carries an identifier of the website, and receiving the version parameter of the current version of the website that is returned according to the identifier of the website by the management server.

3. The method according to claim 2, wherein the obtaining a version number of the current version of the website comprises one of the following:
   obtaining the current version of the website from a version description file of the website;
   obtaining the version number of the current version of the website from a management interface;
   executing an upgrade script file, and after completion of a website upgrade, obtaining the version number of the current version of the website; or
   monitoring a version upgrade process of the website, and after completion of a website version upgrade is determined, obtaining the version number of the current version of the website from a version repository.

4. The method according to claim 1, wherein the obtaining an initial URL of a content file for the to-be-accessed page comprises reading an index file corresponding to the to-be-accessed page, wherein the index file contains the initial URL of the content file; and the method further comprising:
replacing the initial URL of the content file contained in the index file with the generated current URL to generate an updated index file, and adding the updated index file to the access response.

5. The method according to claim 1, wherein
the access response comprises a cache setting parameter that is used to indicate whether the client needs to cache the content file and cache duration.

6. The method according to claim 1, wherein after receiving the access request from the client, the method further comprises:
determining a file type of an index file corresponding to the to-be-accessed page, and determining, according to the file type of the index file, whether the index file comprises the initial URL of the content file.

7. A website access method, comprising:
intercepting, by a proxy server, a first access response from a web server, wherein the first access response is sent after the web server receives an access request from a client, wherein the access request identifies a to-be-accessed page on a website, and wherein the first access response carries an initial URL of a content file for the to-be-accessed page, and the initial URL comprises original path information of the content file;
obtaining, by the proxy server, a version parameter of a current version of the website, and wherein each version of the website corresponds to a unique version parameter;
generating, by the proxy server, a current URL of the content file according to the initial URL of the content file and the version parameter of the current version of the website, wherein the current URL comprises a path information part and a search part, the path information part comprising the original path information of the content file, and the search part comprising the version parameter of the current version of the website;
returning, by the proxy server, a second access response to the client, wherein the second access response carries the current URL of the content file, wherein a cookie of the second access response carries the version parameter, and wherein the current URL is a URL of a first JavaScript (JS) file that references a second JS file; and
receiving, by the proxy server, a file request message from the client to obtain a JS file, wherein the file request message carries the current URL of the first JS file;
receiving, by the proxy server, a request for the second JS file from the client; and
returning, by the proxy server, the second JS file to the client.

8. The method according to claim 7, wherein the obtaining a version parameter of a current version of the website comprises one of the following:
obtaining a version number of the current version of the website, and generating the version parameter according to the version number;
obtaining the version number of the current version of the website, and using the version number of the current version of the website as the version parameter; or sending a version query request to a management server, wherein the version query request carries an identifier of the website, and receiving the version parameter of the current version of the website that is returned according to the identifier of the website by the management server.

9. The method according to claim 8, wherein the obtaining a version number of the current version of the website comprises one of the following:
obtaining the current version of the website from a version description file of the website;
obtaining the version number of the current version of the website from a management interface;
executing an upgrade script file, and after completion of a website upgrade, obtaining the version number of the current version of the website; or
monitoring a version upgrade process of the website, and after completion of a website version upgrade is determined, obtaining the version number of the current version of the website from a version repository.

10. The method according to claim 7, wherein
the initial URL of the content file is contained in an index file of the first access response; and
the method further comprising:
replacing the initial URL of the content file contained in the index file with the generated current URL to generate an updated index file, and adding an updated index file to the second access response.

11. The method according to claim 7, wherein
the second access response comprises a cache setting parameter that is used to indicate whether the client needs to cache the content file and cache duration.

12. The method according to claim 7, wherein after the intercepting a first access response from a web server, the method further comprises:
determining a file type of an index file, in the first access response, corresponding to the to-be-accessed page, and determining, according to the file type of the index file, whether the index file comprises the initial URL of the content file.

13. A website access method, comprising:
sending an access request to a web server, wherein the access request indicates a to-be-accessed page on a website;
receiving an access response in response to the access request, wherein the access response carries a current uniform resource locator (URL) of a content file for the to-be-accessed page, the current URL comprises a path information part and a search part, the path information part comprises original path information of the content file, and the search part comprises a version parameter of a current version of the web site, and wherein a cookie of the access response carries the version parameter, and the current URL is specifically a URL of a first JavaScript (JS) file;
sending a file request message to the web server so as to obtain the first JS file, wherein the file request message carries the current URL of the first JS file;
obtaining the version parameter from the cookie;
executing the first JS file to create an XmlHttpRequest object, wherein a destination URL in the XmlHttpRequest object comprises original address information of a second JS file and the version parameter, and the second JS file is referenced by the first JS file; and
obtaining the second JS file from the web server by using the XmlHttpRequest object.

14. The method according to claim 13, further comprising:
storing a filename and a version parameter of a cached content file for the web site wherein the cached content file was obtained prior to sending the file request message to the web server.

15. The method according to claim 14, wherein before sending the file request message to the web server, the method further comprising:
querying the stored filename and version parameter of the cached content file to determine that the content file comprised in the to-be-accessed page is not cached.

16. A website system, comprising:
a web server; and
a proxy server, wherein
the web server is configured to:
receive an access request from a client, wherein the access request indicates a to-be-accessed page on a website, and
return a first access response to the client, wherein the first access response carries an initial URL of a content file comprised in the to-be-accessed page, and the initial URL comprises original path information of the content file, and
the proxy server is configured to:
intercept the first access response, and obtain a version parameter of a current version of the website, wherein each version of the website corresponds to a unique version parameter,
generate a current URL of the content file according to the initial URL of the content file and the version parameter of the current version of the website,
return a second access response to the client, wherein the second access response carries the current URL of the content file, the current URL comprises a path information part and a search part, the path information part comprises the original path information of the content file, and the search part comprises the version parameter of the current version of the website, wherein a cookie of the second access response carries the version parameter, and wherein the current URL is a URL of a first JavaScript (JS) file that references a second JS file,
receive a file request message from the client to obtain a JS file, wherein the file request message carries the current URL of the first JS file,
receive a request for the second JS file from the client, and
return the second JS file to the client.

17. A server, comprising:
a processor; and
a memory coupled to the processor,
wherein the memory has a plurality of instructions stored thereon, that when executed by the processor, cause the processor to perform operations comprising:
receiving an access request from a client, wherein the access request indicates a to-be-accessed page on a website;
obtaining an initial uniform resource locator (URL) of a content file for the to-be-accessed page in response to the access request, wherein the initial URL comprises original path information of the content file;
obtaining a version parameter of a current version of the website, and wherein each version of the website corresponds to a unique version parameter;
generating a current URL of the content file according to the initial URL of the content file and the version parameter of the current version of the website, wherein the current URL comprises a path information part and a search part, the path information part comprising the original path information of the content file, and the search part comprising the version parameter of the current version of the website;
returning an access response to the client, wherein the access response carries the current URL of the content file, wherein a cookie of the access response carries the version parameter, and wherein the current URL is a URL of a first JavaScript (JS) file that references a second JS file;
receiving a file request message from the client to obtain a JS file, wherein the file request message carries the current URL of the first JS file;
receiving a request for the second JS file from the client; and
returning the second JS file to the client.

18. An apparatus for accessing a website, comprising:
at least one processor;
a memory for storing instructions, which when executed by the processor, causing the apparatus to perform:
sending an access request to a web server, wherein the access request indicates a to-be-accessed page on a website;
receiving an access response in response to the access request, wherein the access response carries a current uniform resource locator (URL) of a content file for the to-be-accessed page, the current URL comprises a path information part and a search part, the path information part comprises original path information of the content file, and the search part comprises a version parameter of a current version of the web site, and wherein a cookie of the access response carries the version parameter, and the current URL is specifically a URL of a first JavaScript (JS) file;
sending a file request message to the web server so as to obtain the first JS file, wherein the file request message carries the current URL of the first JS file;
obtaining the version parameter from the cookie;
executing the first JS file, to create an XmlHttpRequest object, wherein a destination URL in the XmlHttpRequest object comprises original address information of a second JS file and the version parameter, and the second JS file is referenced by the first JS file; and
obtaining the second JS file from the web server by using the XmlHttpRequest object.

19. The apparatus according to the claim 18, wherein the instructions further cause the apparatus to perform:
storing a filename and a version parameter of a cached content file for the web site wherein the cached content file was obtained prior to sending the file request message to the web server.

20. The apparatus according to the claim 19, wherein the instructions further cause the apparatus to perform:
querying the stored filename and version parameter of the cached content file to determine that the content file comprised in the to-be-accessed page is not cached.

* * * * *